UNITED STATES PATENT OFFICE.

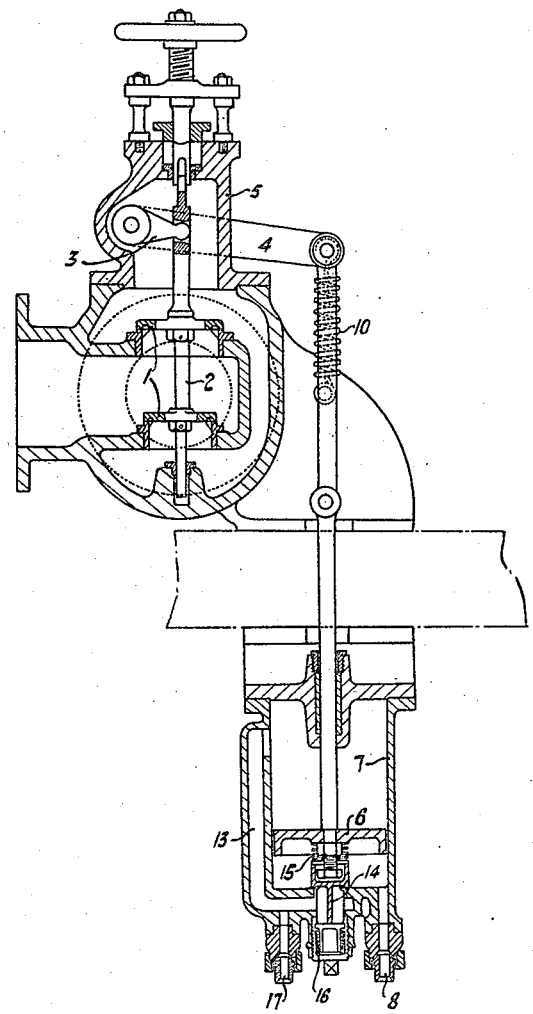

DAVID COCKBURN AND DONALD MacNICOLL, OF CARDONALD, NEAR GLASGOW, SCOTLAND.

ENGINE STOP GEAR.

1,416,791.   Specification of Letters Patent.   Patented May 23, 1922.

Application filed February 3, 1920. Serial No. 355,924.

*To all whom it may concern:*

Be it known that we, DAVID COCKBURN and DONALD MACNICOLL, subjects of the King of the United Kingdom of Great Britain and Ireland, and residing at Cardonald, near Glasgow, Scotland, have invented a certain new and useful Improvement in Engine Stop Gears, of which the following is a specification.

This invention relates to an improved engine stop gear including an emergency valve which automatically shuts off the steam supply to the engine in the event of failure of the forced lubrication system or of drop of oil pressure in the forced lubrication system or in the event of the absence of an overflow of lubricant from a tank or of surplus supply from a pump or the like, which emergency valve can also be operated by hand and by a governor.

In the construction according to the invention the emergency valve is operated directly by a spring, weight or the like on failure of the forced lubrication system or on drop of pressure of the lubricant supplied to the system, or on cessation of an overflow or surplus, without the intervention of an actuating valve or control valve; the emergency valve proper being operatively connected to a piston movable in a cylinder open to the fluid pressure (i. e., piped to the forced lubrication system or source of supply of oil).

The figure of the accompanying drawings is a vertical section showing one embodiment of the invention.

Referring to the drawing the emergency valve is formed as a balanced valve, in the particular instance as a double beat valve 1 carried by a spindle 2 engaged by a lever-arm 3 housed within the valve casing 5 and rigid with a lever-arm 4 located externally of the casing 5 and operatively connected to a piston 6 movable in a cylinder 7 of which the lower end has a pipe connection 8 to the forced lubrication system.

Normally the pressure of the liquid acting on the under face of the piston 6 maintains the lever-arms 3, 4 and thereby the valve spindle 2 in such positions that the valve 1 is held open, the pressure overcoming the action of a spring 10 or a weight or the like tending to close the valve 1.

On drop of pressure or failure of supply the piston 6 falls and the spring 10 rocks the lever arms 3, 4 and thereby displaces the valve spindle 2 in the direction to close the valve 1.

There is provided between the upper and lower ends of the cylinder 7 a by-pass connection 13 the lower end of which is fitted with a valve 14 which is normally held closed by the pressure of oil admitted to the lower end of the cylinder 7 by the pipe connection 8 and which in the fully lowered position of the piston 6 is closed by the piston 6 acting through an interposed spring 15. A second spring 16 is provided which opens the valve 14 on failure of the oil pressure in the system (or absence of surplus) and holds it open during the first stage of the descent of the piston. The oil is thus allowed to escape form the underside of the piston to the by-pass 13 so that dash-pot action which would impede the descent of the piston 6 is avoided.

An overflow connection 17 may be taken off the by-pass connection.

We claim:

In an engine stop gear, in combination, an emergency valve, a load tending to close said emergency valve, a chamber having at its lower end a connection for admission of fluid, and also having an overflow, a piston movable in said chamber, said piston operatively connected to said valve and normally held raised in opposition to said load by pressure of liquid on the underside of said piston, a by-pass between the ends of said chamber, a by-pass valve at the lower end of said chamber controlling said by-pass and adapted to be closed by pressure of liquid in said chamber, a spring interposed between said piston and said by-pass valve, and a spring tending to open said by-pass valve on failure of liquid pressure on the underside of said piston.

In testimony whereof we have signed our names to this specification in the presence of two subscribing witnesses.

DAVID COCKBURN,
DONALD MacNICOLL.

Witnesses:
 KATE FOTHERINGHAN,
 ISABEL ROLLO.